TELEPHONE SYSTEMS

Original Filed April 5, 1963 2 Sheets-Sheet 1

INVENTOR
Michael John Reaves, Jr.
BY [signature] and [signature]
ATTORNEYS

July 18, 1967 M. J. REAVES 3,331,924

TELEPHONE SYSTEMS

Original Filed April 5, 1963 2 Sheets-Sheet 2

INVENTOR

Michael John Reaves, Jr.

BY Hastings Ashley and Walter J. Jagmin

ATTORNEYS 3,331,924
Patented July 18, 1967

3,331,924

TELEPHONE SYSTEMS

Michael John Reaves, 6535 Le Loache St., Dallas, Tex. 75225

Original application Apr. 5, 1963, Ser. No. 270,926, now Patent No. 3,264,411, dated Aug. 2, 1966. Divided and this application Mar. 24, 1966, Ser. No. 554,223
8 Claims. (Cl. 179—1)

This is a division of application Ser. No. 270,926 filed Apr. 5, 1963, and now Patent No. 3,264,411.

This invention relates to telephone systems in which the subscriber has one or more stations or instruments and a plurality of lines and more particularly to a conference means for such telephone systems enabling a subscriber to establish connections with two of such lines whereby a subscriber may join himself and parties on two different lines in a three-way conference connection.

An object of this invention is to provide an easily installed means connectable to the subscribers' telephone system instruments for selectively establishing connection at a particular instrument with any two of a plurality of lines terminated at such instrument whereby a three-way conference may be established by the subscriber.

Still another object is to provide conference establishing means for connecting two of the lines with the receiver and transmitter circuit of one of the subscriber's instruments which is operable solely under the control of the subscriber at such instrument.

A further object is to provide a conference means connectable to a pair of instruments enabling a subscriber to use one instrument to establish communication with one of the plurality of lines and another instrument to establish communication with another of the plurality of lines, the conference means being operable to connect the two selected lines of the two instruments whereby the subscriber at either of the two instruments may hold a three-way conference connection with the two parties on the two different lines.

Another object is to provide a conference means for a key telephone system having a number of subscriber stations or instruments each having access to a plurality of lines and having control means whereby any number of the subscriber stations or instruments may be selectively and simultaneously connected to the same line, the conference means interconnecting two of such lines so that parties at one or more of the instruments may engage in conversation with parties on two different lines whereby a conference may be held at one or more of the subscriber instruments with two parties on two different lines.

Additional objects and advantages of the invention will be readily apparent from the reading of the following description of a device constructed in accordance with the invention, and reference to the accompanying drawings thereof, wherein.

Figure 1:
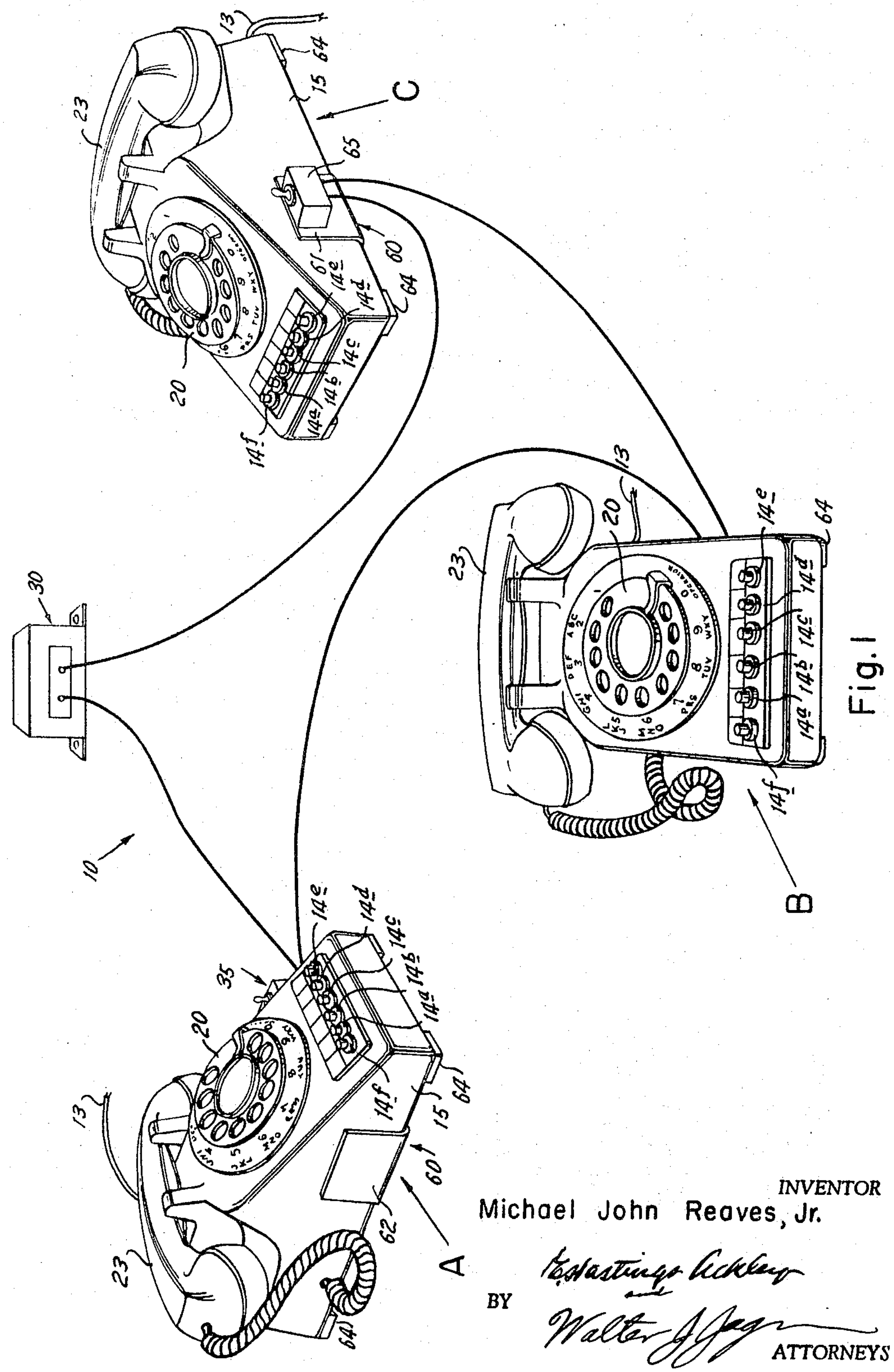
FIGURE 1 is a schematic illustration showing a plurality of common subscriber stations having a plurality of lines provided with the conference means embodying the invention for enabling a subscriber employing two of the stations or instruments to establish a conference call between himself and parties on two different lines terminating at such stations.
Figure 2:
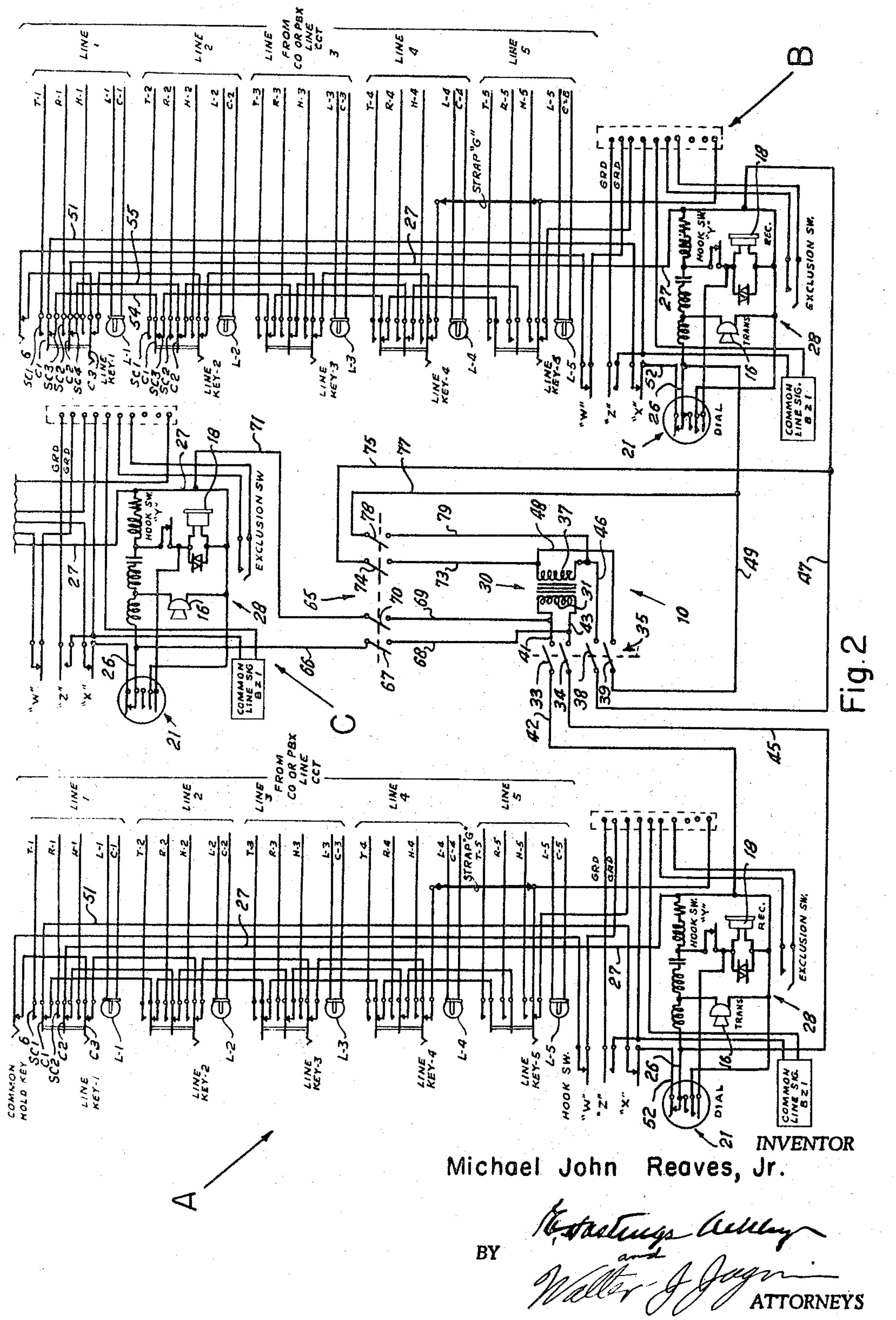
FIGURE 2 is a fragmentary schematic illustration of the system illustrated in FIGURE 1 showing the circuit of each station or instrument with the instrument in the condition obtained with the handset off the cradle and the hook switches operated.

Referring now particularly to FIGURES 1 and 2 of the drawing, the conference means embodying the invention is shown connected to the common stations or instruments A, B and C of the usual key telephone system, such as the one fully illustrated and described in the patent to R. K. Kaye et al., No. 2,845,492, and each has access to all of the telephone lines 1, 2, 3 and 4 and the common or intercom line 5. The incoming terminals and a number of apparatus units including a few relays or other switching devices of such telephone system, not shown, which provide the various functions requisite to the proper operation of such key telephone system are placed at some convenient and inconspicuous location on the subscriber's premises and a cable 13 from such location is multiplied to each such instrument or station.

Each of the instruments or stations may have a row of push buttons 14*a*, 14*b*, 14*c*, 14*d* and 14*e* mounted in the cradle 15 by which the subscriber may operate the line keys 1, 2, 3, 4 and 5 to connect the tip and ring conductors T and R of the lines 1 through 5, respectively, to the transmitter 16 and receiver 18 of the instrument. In general, these five buttons operate in an interlocking arrangement; that is, when one is operated it releases another previously operated. In addition, a push button 14*f* operates a common hold key 6 by means of which the operator at any such station may hold an incoming call on any one of the lines 1 through 4 while initiating or answering a call on any one of the other lines.

By way of example, if a person at instrument A answers a call on line 1 by pushing in the push button 14*a* to operate the line key 1 and then finds out that the call on line 1 is for another party at one of the other instruments or stations B or C, he may momentarily open the common hold key 6 by depressing the hold push button 14*f* to establish a holding circuit for line 1 of the instrument so that the calling party remains connected to the conductors T1 and R1 of the instrument A even though the line key 1 is released. The person at the instrument A then makes a call to another station, for example station B, by pushing the push button 14*e* and dialing a suitable code number by means of the dial 20 of the instrument in the usual manner to cause the bell at such station B to ring so that a second person at the station B may be called to the phone and depress his key 14*e* to establish communication with the party at the station or instrument A through line 5. Upon being informed that the call in line 1 is for him, the second person may depress his push button 14*a* which thus causes the party on the line 1 to be connected to the transmitter receiver circuit of instrument A. When the subscriber at the station B depresses his push button 14*a* he releases the holding circuit of conductors T1 and R1 at station A which had been established by the momentary depression or operation of the push button 14*f* of the instrument A. The key telephone system also permits persons at two or more of the stations A, B and C to hold a conversation with each other and a party on any single one of the lines 1 through 4, for example line 1, by each depressing or operating the push button controlling such line at his station, in this case the push button 14*a*. Any person or persons using any of the instruments A, B or C of such key telephone system cannot however simultaneously hold conversation with parties on any two lines 1, 2, 3 or 4.

The cradle of each instrument also conventionally has the usual dial switch 21 which is controlled by the rotatable dial 20 and two buttons (not shown) which the handset 23 depresses when it is placed on the cradle. These handset depressed buttons operate a hook switch consisting of the contacts W, X, Y and Z, FIGURE 2. The handset of course is lifted from the cradle when a call is to be made from or answered at the instrument so that whenever any one of the keys 1 to 5 is actuated or depressed, the tip and ring conductors T and R of its associated line are connected to the common conductors 26 and 27, respectively, of the receiver and transmitter circuit 28 of such instrument whereby the audio signals from the transmitter of such instrument are transmitted to the tip and ring conductors of the line whose key is actuated and the incoming audio signals from such line are transmitted to the receiver of such instrument. Each of the push buttons, except the hold button, also has a lamp which gives a visual signal whenever its associated circuit or its associated line is in an operative condition or in a hold condition. The lamps are conventionally mounted in the cradle beneath the buttons which are made of a translucent substance.

The operation and circuitry of the above described telephone system is well known and the other circuitry thereof, which is fully explained in the patent to R. K. Kaye et al., No. 2,845,492, will not therefore be further described herein.

The conference means or circuit 10 for enabling a person at any one of such common subscriber stations of instruments, A, B or C to establish communication between himself and two other parties on any two of the lines 1 through 4 terminated at such instruments, includes an inductive means or transformer 30 having one winding 31 which is connectable across the receiver and transmitter circuit 28 of one of the instruments by means of the two contacts 33 and 34 of a quadruple pole single throw switch 35 and having a second winding 37 connected across the transmitter-receiver circuit 28 of another one of the instruments by the other two contacts 38 and 39 of such switch. For example, one side of the winding 31 may be connected by the conductor 41, the movable contact 33 and the conductor 42 to the common conductor 27 of the receiver and transmitter circuit 28 of the instrument A and the other side of the winding 31 may be connected by the conductor 43, the movable contact 34 and the conductor 45 to the other common conductor 26 of the receiver and transmitter circuit of the instrument A so that any audio signals induced in the winding 31 will be impressed across the receiver-transmitter circuit of station A and also across the tip and ring lines T and R of any line 1 through 5 whose key is in actuated position. Voltage fluctuations or audio signals produced at the instrument A across the common conductors 26 and 27 by a person speaking into the transmitter at that station and the audio signals from the conductors T and R of any one of the lines 1 through 4 connected to the receiver and transmitter circuit of the instrument A are also impressed across the transformer winding 31 and induce similar audio signals in the other transformer winding 37. The second winding 37 of the transformer 30 is similarly connected across the receiver and transmitter circuit 28 of the instrument B since one of its sides is connected to the common conductor 26 of instrument B through the conductor 46, the movable contact 38 and the conductor 47 and its other side is connected to the common conductor 27 of the instrument B by the conductor 48, the movable contact 39 and the conductor 49 so that any audio signals or voltage variations induced in the winding 37 are applied across the receiver and transmitter circuit 28 of the instrument B and also across the conductors T and R of any line 1 through 4 of the instrument B whose line key is in actuated position. Similarly any voltage fluctuations or audio signals produced at the instrument B by a person speaking into the transmitter at the station B and any audio signals from the conductors T and R connected to the receiver and transmitter circuit of the instrument B are applied across the winding 37 and induce similar audio signals in the windng 31.

It will thus be apparent that when the switch 35 is in closed position, a person at either the instrument A or the instrument B may engage in a three party conversation or conference with two other parties one of whom is connected to one of the instruments A or B by one of the lines 1 through 4 and the other of whom is connected to the other of the instruments A and B by another of the lines 1 through 4. The handsets of both instruments must be off their cradles during such conference.

In use, if a person at station or instrument A is engaged in conversation with a party on line 1, for example, he has picked up the handset to cause the switches W, X, Y and Z to assume their operative positions illustrated in FIGURE 2 and has depressed or actuated the pushbutton **14*a* to connect the conductor T1 to the common conductor 26 through the stationary and movable contacts SC1 and C1, respectively, of the line key 1, the conductor 51, the switch X, the conductor 52 and a suitable contact of the dial switch 21 and to connect the line R1 to the common conductor 27 through the stationary and movable contacts SC2 and C2, respectively, of the line key 1. The movable contact C3 of the line key 1 controls in the usual manner the operation of the holding circuit. Since the conductors T1 and R1 of line 1 are now connected to the common conductors 26 and 27, and thus to the receiver and transmitter circuit 28 of the instrument A, the person at station A may carry on a conversation with a party on line 1**.

If the person at the station or instrument A now decides to conduct a conference with the party on line 1 and a second party at another remote location, he picks up the handset of the station or instrument B, while maintaining the handset of instrument A off its cradle, depresses one of the pushbuttons **14*b* through 14*d* of the instrument B in order to use any line other than line 1, for example pushbutton 14*b* and thus line 2, dials the number of the second party in the usual manner so that when the second party answers, the conductors T2 and R2 are connected to the common conductors 26 and 27, respectively, of the receiver and transmitter circuit 28 of the instrument B. The conductor T2 is then connected to the common conductor 26 through the stationary and movable contacts SC1 and C1 of the line key 2, the conductor 54, the stationary and movable contacts SC3 and C1 of line key 1, the conductor 51, the hook switch X, the conductor 52 and a suitable contact of the dial switch 21. The conductor R2 of line 2 is connected to the common conductor 27 through the stationary and movable contacts SC2 and C2 of the line key 2, the conductor 55 and the stationary and movable contacts SC4 and C2 of the line key 1. When the third party answers at the remote location, the person operating the conference means or circuit 10 closes the switch 35 and the three parties may then carry on a conference since, if the person is using the handset of instrument A, the audio signals from the transmitter 16 of the station A and the incoming audio signals of line 1 are applied across the transformer winding 31 and thus induce similar audio signals in the transformer winding 37 which in turn are applied to receiver 16 of the instrument B thereof and also through the described elements or circuit of the instrument B to the conductors T2 and R2 of line 2. Conversely any audio signals from the transmitter of station B and from the lines T2 and R2 are applied across the transformer winding 37 to induce similar audio signals in the transformer winding 31 which in turn are applied to the receiver 18 of instrument A and through the described elements or circuit of instrument A to the conductors T1 and R1 of line 1 so that the party on the line 1 connected to instrument A will hear and be heard by the party on the line 2 connected to the instrument B. The person employing the handset of either instrument A or instrument B hears and is heard by the parties on lines 1 and 2. The handsets of the two instruments A and B must be kept off their cradles during such conference. When the conference is terminated, the switch 35 is opened and the handsets of instruments A and B are replaced in their cradles. It will be apparent of course that, since the transformer windings 31 and 37 are connected across the common conductors 26 and 27 of the instruments A and B, respectively, calls on any of the four lines 1 through 4 of the instruments A and B may be interconnected by the person at the stations A or B so that a party on any of the lines 1 through 4 connected through its associated line key of one of the instruments A and B to its receiver and transmitter circuit may be connected with another party on another of the lines 1 through 4** connected through its associated line key of the other of the instruments A and B to its receiver and transmitter circuit.

The transformer windings, whose impedance is chosen to match the impedance of the lines, are connected to the instruments only when actually in use and do not therefore in any manner adversely effect the operation of the telephone system.

It will now be apparent that a very simple and inexpensive conference means or circuit has been illustrated and described for a key telephone system having a plurality of common subscriber stations or instruments, such as the instruments A, B and C, at each of which a plurality of telephone lines 1 through 4 terminate so that by the use of two of such instruments, the person using any one of the instruments may carry on a conference with parties on any two of such lines.

It will further be seen that a simple and inexpensive conference means or circuit has been illustrated and described which enables a subscriber having a plurality of common stations or instruments, such as the instruments A, B and C, at each of which a plurality of telephone lines terminate, to initiate and hold conference calls between parties on any selected two of the lines and that the conference means is easily connected to such instrument since only two conductors must be connected at appropriate terminals or points of the circuit of two such instruments.

The switch 35 may be attached to the cradle of the handset A or B in any desired manner, as by a suitable clamp, such as the clamp 60 having a pair of upstanding arms 61 and 62 which frictionally engage opposite sides of the cradle and a horizontal bar 63 which extends beneath the cradle between the usual spaced feet 64 of the cradle, so that no alteration or modification of the instrument is necessary when attaching the switch thereto. The switch may be secured to the arm 61. The transformer 30 may also be attached to such cradle by the clamp 60, in which case it may be secured to the other arm 62 of the clamp. The transformer may also of course be located at any other suitable location, as at the side of a desk and be secured thereto, if desired, by any suitable means, such as screws, bolts or clamps.

If it is desired that a person employing a third station or instrument C of the system also be able to hold conference calls on any two of the lines 1 through 4, the instrument C is provided with a switch 65, identical with switch 35, so that its receiver and transmitter circuit 28 may be connected across the winding 31 of the transformer 30 by means of the conductor 66, switch contact 67, conductors 68, 43, 41 and 69, movable contact 70 and the conductor 71. The transformer winding 37 may be connected across the receiver and transmitter circuit of the instrument B through the conductors 48 and 73, the contact 74, the conductors 75, 47, 49 and 77, the movable contact 78 and the conductors 79 and 46. It will be apparent that a person using the instrument C may also engage in a conference with two remote parties by using one instrument B or C to receive or place a call on one of the lines 1 through 4 and using the instrument B or C to place or receive another call on another of the lines 1 through 4, and then closing the switch 65.

It will be apparent that as is usual in such telephone systems any number of the instruments may be connected to any one of the lines 1 through 4 by depressing or actuating the pushbutton of such line at such instruments even though such line is connected to another line by the conference circuit. For example, another person at the instrument C can join a conference being held by a person at the instrument A who is connected to one party on one line, for example line 1, by means of the instrument A and to a second party on another line, for example line 2, by means of the instrument B, by depressing either the pushbutton 14*a* or the pushbutton 14*b* of the instrument C.

It will now be seen that a new and improved conference means or circuit has been illustrated and described which is easily attached to an instrument merely by securing two conductors from the switch to appropriate terminals in the cradles of each of two instruments to permit connection of the two transformer windings through the switch 35 across the receiver and transmitter circuits 28 of the two instruments.

It will further be seen that the transformer windings are completely disconnected from the telephone lines when not in use so that the conference means does not in any manner interfere with the normal operation of the telephone system.

It will further be seen that a new and improved conference means for attachment to the usual instruments of a key telephone system has been illustrated and described which is easily operable by the person using the instrument to establish a conference connection between himself and two parties on two different lines without the necessity, and the delays attendant thereon, of calling a PBX or central operator to establish such conference call.

It will also be seen that if a subscriber or person having a station or stations to which the conference means 10 is connected is engaged in conversation with a first party on any one of the plurality of lines and receives an incoming call on another line from a second party, he may easily establish a three party conference with the two parties by use of such conference means, it being apparent that if the subscriber is having a conversation with a first party on one line using the instrument A, B or C and an incoming call is received on another line, he answers such call by use of any other of the instruments A, B or C and then actuates the switch 35 or the switch 65 to connect the receiver and transmitter circuit of the instrument B with the receiver and transmitter circuit of the instrument A or C, respectively, as the case may be.

It will also be seen that the conference means 10 may also be employed by a subscriber having two stations or instruments with a single line terminated at each instrument, the two lines being different, since one transformer winding of the conference means is connectable across the receiver and transmitter circuit of one instrument, and therefore across one of the lines, and the other transformer winding is connectable across the receiver and transmitter circuit of the other instrument and therefore across the other of the two lines.

It will further be seen that the utility of the conference means is greatly enhanced by the availability of the so-called "area code system" whereby a subscriber may employ his own instrument to place not only local calls but also long distance calls instead of placing such long distance calls through a central operator.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. In a telephone system having at least two common subscriber instruments, each having a receiver and transmitter circuit, a plurality of lines terminating at each of the instruments, holding means individual to each of said lines and operable at each of the instruments for placing holding conditions on each of said lines, and key means for selectively and individually connecting said lines to said receiver and transmitter circuit; conference means operable at one of the instruments for operatively connecting the receiver and transmitter circuits of two of said subscriber instruments to one another whereby a party employing one of said instruments may hold a three party conference with a party on one line connected by its associated key means to the receiver and transmitter circuit of one of the two instruments and a party on another line connected by its associated key means to the receiver and transmitter circuit of the other of the two instruments.

2. In a telephone system having at least two common subscriber instruments, each having a receiver and transmitter circuit, a plurality of lines terminating at each of the instruments, holding means individual to each of said lines and operable at each of the instruments for placing holding conditions on each of said lines, and key means for selectively and individually connecting said lines to said receiver and transmitter circuit; conference means operable at one of said instruments for operatively connecting the receiver and transmitter circuits of two of said instruments whereby a party employing one of said instruments may hold a three party conference with a party on one line connected by its associated key means to the receiver and transmitter circuit of one of said two instruments and a party on another line connected by its associated key means to the receiver and transmitter circuit of the other of said two instruments, said conference means including a transformer having two windings; and connecting means including switch means for connecting one of said windings across the receiver and transmitter circuit of one of said two instruments and the other of said two windings across the receiver and transmitter circuit of the other of said two instruments.

3. The conference means of claim 2, wherein said switch means includes a switch having two pairs of contacts, one pair of contacts connecting one of said windings across the receiver and transmitter circuit of one of said instruments and the other pair of said contacts connecting the other of said windings across the receiver and transmitter circuit of the other of said instruments when said switch means is in closed position.

4. In a telephone system having at least two common instruments each having a receiver and transmitter circuit and at least one line terminating at each of said instruments, and means for connecting the receiver and transmitter circuit of each instrument with the line terminating at such instrument; conference means operable at one of the instruments for selectively connecting the receiver and transmitter circuits of said two instruments, said conference means including inductive means and switch means for connecting said inductive means to said the receiver and transmitter circuits of the two instruments.

5. The conference means of claim 4, wherein said inductive means comprises a transformer having a pair of windings and said switch means comprises a switch having two pairs of contacts, one pair of said contacts connecting one of said windings across the receiver and transmitter circuit of one of said instruments and the other pair of said contacts connecting the other of said windings across the receiver and transmitter circuit of the other of said instruments when said switch means is in closed position.

6. The conference means of claim 5, wherein the impedance of said transformer matches the impedances of the lines terminating at said instruments.

7. In a telephone system having at least two common instruments each having a receiver and transmitter circuit and at least one line terminating at each of said instruments, and means for connecting the receiver and transmitter circuit of each instrument with the line terminating at such instrument; conference means operable at one of the instruments, said conference means including a transformer having two windings, means including switch means for connecting one of said windings across the receiver and transmitter circuit of one of said instruments and switch means for connecting the other of said windings across the receiver and transmitter circuit of the other of said instruments.

8. The conference means of claim 7, wherein said switch means comprises a switch having two pairs of contacts, one pair of said contacts connecting one of said windings across the receiver and transmitter circuit of one of said instruments and the other pair of said contacts connecting the other of said windings across the receiver and transmitter circuit of the other of said instruments when said switch means is in closed position.

No references cited.

KATHLEEN H. CLAFFY, *Primary Examiner.*

R. MURRAY, *Assistant Examiner.*